(12) United States Patent
Ruder et al.

(10) Patent No.: US 8,459,425 B2
(45) Date of Patent: Jun. 11, 2013

(54) TORQUE TRANSMISSION UNIT

(75) Inventors: Willi Ruder, Lahr (DE); Stefan Mackowiak, Buehl (DE); Martin Dilzer, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 15 days.

(21) Appl. No.: 13/043,802

(22) Filed: Mar. 9, 2011

(65) Prior Publication Data

US 2011/0162480 A1    Jul. 7, 2011

Related U.S. Application Data

(63) Continuation of application No. PCT/DE2009/001204, filed on Aug. 27, 2009.

(30) Foreign Application Priority Data

Sep. 11, 2008 (DE) .......................... 10 2008 046 790

(51) Int. Cl.
*F16D 3/12* (2006.01)
*B60K 6/10* (2006.01)

(52) U.S. Cl.
USPC ...... 192/48.8; 74/574.2; 74/661; 192/48.603; 310/51

(58) Field of Classification Search
USPC ..................... 192/48.603; 74/574.2
See application file for complete search history.

(56) References Cited

U.S. PATENT DOCUMENTS

| | | | | |
|---|---|---|---|---|
| 5,520,271 A * | 5/1996 | Kohno et al. | ................ | 74/574.2 |
| 6,026,940 A * | 2/2000 | Sudau | .......................... | 192/3.28 |
| 6,302,253 B1 * | 10/2001 | Link et al. | .................. | 192/55.61 |
| 6,424,126 B1 * | 7/2002 | Ohsawa | ............................ | 322/4 |
| 2007/0278029 A1 | 12/2007 | Sugiyama et al. | | |
| 2008/0060859 A1 * | 3/2008 | Klemen et al. | ............... | 180/65.3 |

FOREIGN PATENT DOCUMENTS

DE    10 2006 028 556 A1    1/2007
EP        1 094 218 A1    4/2001

* cited by examiner

*Primary Examiner* — Rodney Bonck
(74) *Attorney, Agent, or Firm* — Lucas & Mercanti, LLP

(57) ABSTRACT

A torque transmission unit which has a first centrifugal mass that can be non-rotatably associated with an internal combustion engine and a second centrifugal mass that is connected downstream of the first mass and can be associated with a transmission. The second centrifugal mass has a rotor of an electric machine for transmitting a torque that can be electrically generated to the second centrifugal mass and a centrifugal force pendulum for reducing torsional vibrations.

10 Claims, 1 Drawing Sheet

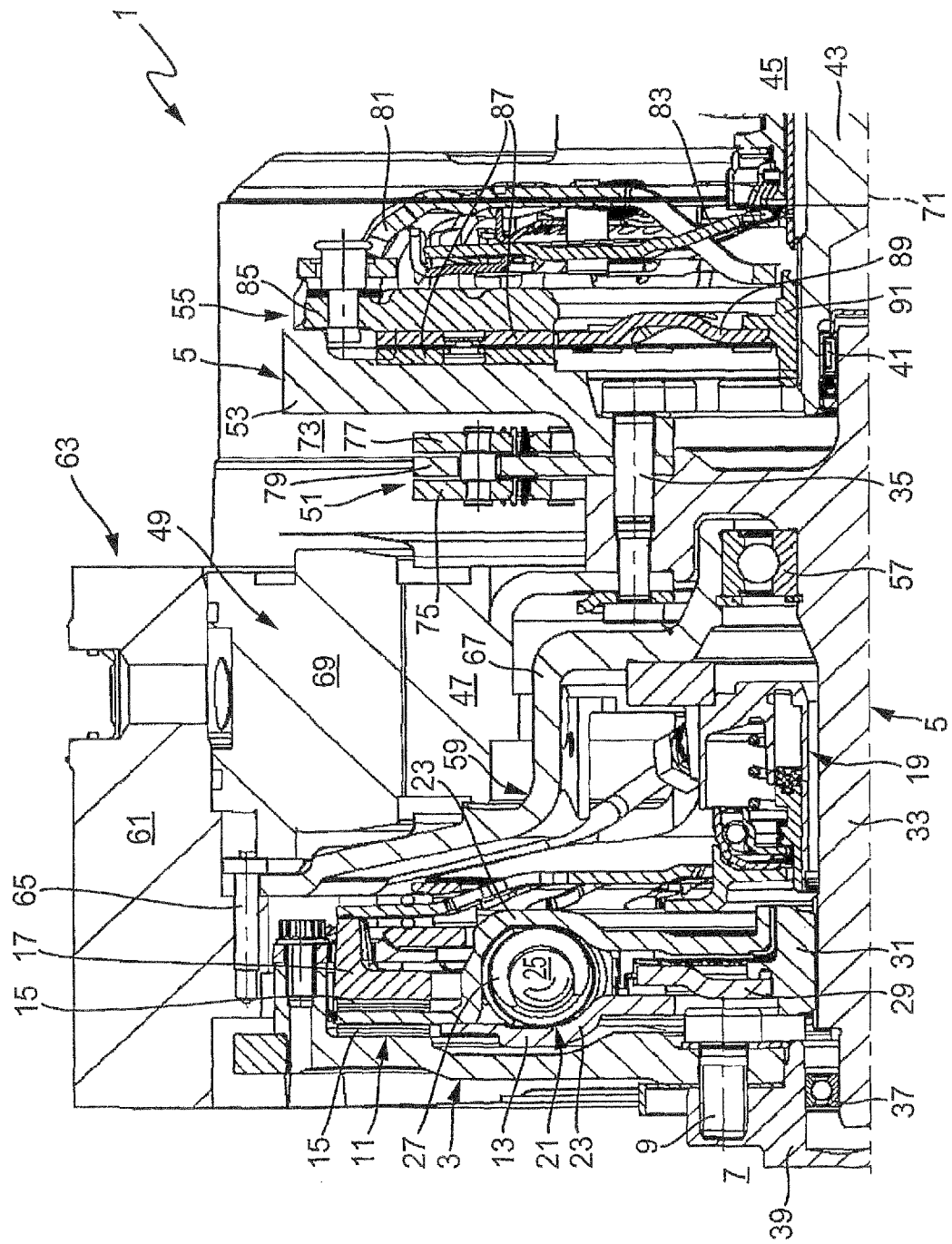

TORQUE TRANSMISSION UNIT

This application is a Continuation PCT/EP2009/001204 filed Aug. 27, 2009, which in turn claims the priority of DE 10 2008 046 790.1 filed Sep. 11, 2008, the priority of both applications is hereby claimed and both applications are incorporated by reference herein.

FIELD OF THE INVENTION

The invention relates to a torque transmission unit with a first centrifugal mass assignable to an internal combustion engine so as to rotate therewith, and a second centrifugal mass assignable to a gear unit and connected downstream of the first centrifugal mass.

BACKGROUND OF THE INVENTION

Torque transmissions units are known and serve for transmitting torques between the internal combustion engine and the gear unit. For reducing the rotary vibrations occurring during the transmission, the centrifugal masses can be assigned so as to be rotatable relative to each other. Moreover, it is known for reducing the rotary vibrations to provide a centrifugal force pendulum device. German patent application publication DE 10 2006 028 556 A1 discloses a torque transmission unit with a rotary vibration damper and a centrifugal force pendulum device which is arranged in the axial direction between an energy storage device and a counter pressure plate of a clutch. In another embodiment, it is shown that the centrifugal force pendulum device may also be arranged radially within the energy-storing unit.

SUMMARY OF THE INVENTION

It is the object of the invention to make available an improved torque transmission unit, particularly for hybrid applications, in which an internal combustion engine and an electric motor are provided.

In a torque transmission unit, the object is met by a first centrifugal mass assignable non-rotatably to an internal combustion engine and a second centrifugal mass connected downstream of the first centrifugal mass and assignable to a gear unit, in that the second centrifugal mass has a rotor of an electric machine for transmitting an electrically producible torque to the second centrifugal mass and a centrifugal force pendulum device for reducing rotary vibrations. The first centrifugal mass can be driven by means of the internal combustion engine and the second centrifugal mass can be driven via the first centrifugal mass, wherein advantageously torques are transmittable between the internal combustion engine and the gear unit. Advantageously, an electrical drive or decelerating moment can additionally be transmitted by means of the electric machine to the second centrifugal mass. This torque can be transmitted to the gear unit and/or the internal combustion engine, for example, for driving or decelerating a motor vehicle equipped with the torque transmission unit. In addition, it is possible to start the internal combustion engine by means of the electrical machine. The electrical machine may be an electric motor, for example, a synchronized or asynchronized machine, a generator, for example, a starter generator. Advantageously, by means of the torque transmission unit, a parallel hybrid arrangement can be realized for the motor vehicle equipped with the parallel hybrid arrangement. In this connection, the centrifugal force pendulum device provided can reduce or especially eliminate the rotary vibrations occurring during the operation of the internal combustion engine or during transmitting torques between the internal combustion and the gear unit. The centrifugal force pendulum device can be constructed as disclosed in DE 10 2006 028 556 A1. This document, especially the figures and the corresponding description of the figures, are incorporated into this application by reference. The reduction of rotary vibrations can be understood to mean a vibration isolation of rotary vibrations occurring during the operation of the internal combustion engine, an elimination and/or damping of the rotary vibrations. The second centrifugal mass can advantageously be assigned to the gear unit in such a way that between the gear unit and the second centrifugal mass torques are transmittable, for example, the torques which can be produced during operation of the internal combustion engine and/or the electric machine.

In one embodiment of the torque transmission unit, it is provided that the first centrifugal mass and the second centrifugal mass are assignable or assigned by means of an energy storage device so as to be rotatable relative to each other. Advantageously, the first centrifugal mass, the intermediately arranged energy storage device and the second centrifugal mass can dampen rotary vibrations according to the principle of a so called dual mass flywheel.

In another embodiment of the torque transmission unit, it is provided that between the first centrifugal mass and the second centrifugal mass, a separating clutch is connected.

Advantageously, an energy flux or a transmission of a torque between the internal combustion engine and the second centrifugal mass can optionally be separated or established by means of the separating clutch. When the separating clutch is closed, a torque transmission between the internal combustion engine and the gear unit is possible. When the separating clutch is open, the internal combustion engine runs freely, i.e., it can be switched off, wherein advantageously the second centrifugal mass still either runs freely or can be driven or decelerated by means of the electric machine. It is conceivable that the separating clutch has a portion of the first centrifugal mass, i.e., when the clutch is open, the first centrifugal mass is assigned only partially to the internal combustion engine. It is conceivable in this connection to dimension the first centrifugal mass which remains when the separating clutch is open in such a way that the internal combustion engine is not capable of operating, i.e. the internal combustion engine motor always stands still when the separating clutch is open. This may be useful especially for restarting the internal combustion engine because of the significantly reduced motor centrifugal mass, i.e., the portion of the first centrifugal mass remaining in front of the separating clutch result in particularly quick restarting times of the combustion engine.

In another embodiment of the torque transmission device it is provided that by way of the energy storage device, the second centrifugal mass is assigned a third centrifugal mass rotatable relative thereto for storing and releasing energy. Advantageously, according to the principle of a dual mass flywheel, rotary vibrations can be dampened.

In accordance with another embodiment of the torque transmission unit, it is provided that by means of the separating clutch the third centrifugal mass can be assigned to the first centrifugal mass or separated therefrom. Advantageously, when the separating clutch is closed, the third centrifugal mass can act as part of the first centrifugal mass, for example, in order to keep the internal combustion engine ready for operation. The total centrifugal mass resulting from the third centrifugal mass and the first centrifugal mass is assigned via the energy storage device to the second centrifugal mass so as to be rotatable relative thereto. Advantageously, when the separating clutch is closed, a rotary vibration damper results in accordance with the principle of a two mass flywheel. The energy storage device can have, for example, for coupling, for energy storage and dampening of rotary vibrations between the first centrifugal mass coupled to the third centrifugal mass and the second centrifugal mass at least one or a plurality of arc springs.

In accordance with another embodiment of the torque transmission unit, it is provided that the rotor of the electric machine includes the centrifugal force pendulum device. Advantageously, the centrifugal force pendulum device can be arranged via the rotor to the second centrifugal mass and can reduce the rotary vibrations when transmitting torques.

In another embodiment of the torque transmission unit it is provided that the centrifugal force pendulum device is arranged radially outside of the intermediate shaft of the second centrifugal mass. The arising torques can be transmitted by means of the intermediate shaft. Advantageously, the centrifugal force pendulum device can be arranged as far radially outwardly of the intermediate shaft as possible, so that centrifugal forces acting on the centrifugal force pendulum device are especially high, wherein this advantageously results in a particularly good action of the centrifugal force pendulum device.

In another embodiment of the torque transmission unit, it is provided that at least one element of the following group is connected downstream of the second centrifugal mass: Start-up clutch, a manual shift gear unit, for example, also automatic, a step-by-step automatic gear unit, a step automatic gear unit with converter, a double clutch gear unit, a CVT gear unit. The start-up clutch and/or the separating clutch may be constructed as conventional clutches or as self-readjusting clutches (SAC). Advantageously, a motor vehicle equipped with the torque transmission unit can start in the known manner by means of the start-up clutch and facilitate a synchronization of gears of a downstream standard transmission. Advantageously, several hybrid arrangements with a start-up clutch and a standard transmission and/or a double clutch gear unit, a stepped automatic gear unit and/or a step automatic gear unit with converter, or a CVT gear unit are possible.

In another embodiment of the torque transmission unit, it is provided that the centrifugal force pendulum device is arranged axially adjacent to a rigid flywheel, particularly a counter pressure plate, of the start-up clutch. Advantageously, a structural space remaining next to the counter pressure plate can be utilized.

In another embodiment of the torque transmission unit it is provided that the centrifugal force pendulum device is arranged axially between the start-up clutch and the electric machine. Advantageously, a remaining axial structural space can be utilized between the electric machine and the start-up clutch for positioning the centrifugal force pendulum device.

BRIEF DESCRIPTION OF THE DRAWING

Further advantages, features and details result from the following description in which an embodiment is described in detail with reference to the drawing. Equal, similar and/or functionally equivalent parts are provided with the same reference numerals. In the drawing:
The FIGURE shows a torque transmission unit with an electric machine in half section.

DETAILED DESCRIPTION OF THE INVENTION

The FIGURE shows a torque transmission unit 1 with a first centrifugal mass and a second centrifugal mass 5 downstream for the first centrifugal mass. The first centrifugal mass 3 is assignable non-rotationally to an internal combustion engine 7 indicated in the FIGURE by the reference numeral 7, for example, by means of a flange 9. The separating clutch 11 is assigned to the first centrifugal mass 3. The separating clutch 11 is part of the first centrifugal mass 3 and has, for the non-rotating connection of the first centrifugal mass 3 with a third centrifugal mass 13, clutch linings 15 and, for pressing-on of these, pressure plates 17 configured for this. The pressure plate 17, or the separating clutch 11, can be constructed so as to be hydraulically operated by means of a hydraulic operating device 19. The third centrifugal mass 13 is assigned to the second centrifugal mass 5 in a rotatable manner relative to the latter by means of an energy storage device 21 for transmitting a torque. The third centrifugal mass 13 has, for surrounding the energy storage device 21, two sheet metal parts 23. By means of the sheet metal parts 23, a grease reservoir 25 can be formed for arc springs 27 of the energy storage device 21. Via the arc springs 27 of the energy storage device 21, the third centrifugal mass 13 and the second centrifugal mass 5 are assigned to each other spring-loaded and rotatable relative to each other. When the separating clutch 11 is closed, a vibration capable system is obtained between the total centrifugal mass and the second centrifugal mass 5, wherein the total centrifugal mass includes the first centrifugal mass 3 and the third centrifugal mass 13.

The second centrifugal mass 5 has a start-up flange 29 which is in engagement with the arc springs 27 of the energy storage device 21. The start-up flange 29 is assigned non-rotatably to the second centrifugal mass 5 for transmitting a torque of a hub 31. The hub 31, in turn, is assigned non-rotatably by means of a toothing to an intermediate shaft 33 of the second centrifugal mass. The intermediate shaft 33 is supported by means of a first pilot bearing 37 in a crank shaft 39 of the internal combustion motor 7 and is supported by means of a second intermediate shaft bearing 57. The intermediate shaft 33 has an intermediate flange 35 which non-rotatably couples the intermediate shaft 33 with a rotor 47 of an electric machine 49, a centrifugal force pendulum device 51 as well as a counter pressure plate 53 of a start-up clutch 55. The intermediate shaft bearing 57 is assigned by means of a bearing sheet 59 fixedly to a housing 61 of a housing 63 of the torque transmission unit 1. For this purpose, the bearing sheet 59 can be fixedly assigned to the housing part 61 of the remaining housing 63 by means of a screw connection 65. The gear unit input shaft 43 is supported via a pilot bearing 41 on the intermediate shaft 33.

The bearing sheet 59 is stepped and forms a partial housing for the separating clutch 11, the energy storage device 21 as well as the hydraulic actuating device of the separating clutch 11. Radially outside of a step 67 of the bearing sheet 59 of the housing 63, i.e., outside of the partial housing of the separating clutch 11, the rotor 47 of the electric machine 49 is arranged. Radially outside of the rotor 47 and within the housing 63 is arranged an exciter device 69 of the electric machine 49.

The centrifugal force pendulum device 51 is arranged axially between the rotor 47 of the electric machine 49 and the counter pressure plate 53 of the start-up clutch 55. The terms axial and radial may refer to an axis of rotation 71 of the torque transmission unit 1. The term axial may serve for describing a direction or parallel to the axis of rotation 71 of the torque transmission unit 1. The centrifugal force pendulum device 51 is arranged adjacent to the electric machine 49 or to the rotor 47 of the electric machine 49 and adjacent to the counter pressure plate 53 of the start-up clutch 55 as well as radially outside of the intermediate shaft 33. Alternatively, it is conceivable to assign the centrifugal force pendulum device 51 directly to the rotor 47 and/or the intermediate shaft 33 and/or counter pressure plate 53 of the start-up clutch 55.

The centrifugal force pendulum device 51 is arranged in an essentially greaseless space 73 and includes several pendulum masses 75, 77. The pendulum masses 75, 77 are moveable, for example, by means of rollers mounted on a carrier flange 79 of the centrifugal force pendulum device 51. The carrier flange 79 is part of the intermediate flange 35 and is assigned by the intermediate flange 35 non-rotatably to the intermediate shaft 33, i.e., the second centrifugal mass 5. The centrifugal force pendulum device 51 includes preferably several, for example four pendulum masses 75, 77, or pendulum mass pairs which are uniformly distributed over the circumference of the carrier flange 79. The centrifugal force pendulum device 51 may be constructed like the various centrifugal force pendulum devices which are disclosed in the German patent application publication DE 10 2006 028 556 A1. The centrifugal force pendulum device 51 may however also be constructed as other conventional centrifugal force pendulum devices.

The start-up clutch 55 has a cover 81 and a counter pressure plate 85 which can be actuated by means of a disengaging device 83. In this manner, by means of the start-up clutch 55 it is possible in a known manner to transmit a torque from the intermediate shaft 33 by means of clutch linings 87, a clutch disk 89 and a clutch hub 91 to the gear unit input shaft 43 or to separate the gear unit input shaft 43 from the intermediate shaft 33.

When the separating clutch 11 is open and the start-up clutch 55 is closed, the electric machine 49 is non-rotatably assigned to the gear unit 45, i.e., can be used, for example, for driving or decelerating, particularly for recuperation of the motor vehicle equipped with the torque transmission unit 1.

When the separating clutch 11 is open and the start-up clutch 55 is open, the internal combustion engine 7 as well as the electric machine 49 are entirely separated from the gear unit 45, i.e., from the remaining drive train of the motor vehicle. This condition can be utilized, for example, when the motor vehicle stands still. A stand still of the motor vehicle is also possible when the separating clutch 11 is closed and the start-up clutch 55 is open, wherein the internal combustion engine 7 can be kept in operation, for example, in order to carry out a start-up procedure controlled or adjusted by the start-up clutch 55. When the internal combustion engine 7 is standing still and the motor vehicle is driving, it is conceivable to start-up the internal combustion engine 7 by closing the start-up clutch 55.

When the separating clutch 11 is open and the start-up clutch 55 is closed, it is possible to let the internal combustion engine run freely, particularly to allow it to stand still. Advantageously, the internal combustion engine 7 can be started by closing the separating clutch 11. This procedure can be reinforced by means of the electric machine 49 of the rotating energy of the second centrifugal mass 5 and/or by means of the motor vehicle which is in movement. In addition, it is conceivable to start the internal combustion engine 7 by means of the electric machine 49 with the separating clutch 11 being closed and the start-up clutch 55 being open. Furthermore, it is conceivable to charge a battery, not illustrated, or an energy storage device, particularly a capacitor of the motor vehicle for storing electrical energy, also in this state of operation, by way of the internal combustion engine, for instance when the motor vehicle stands still.

The centrifugal masses 3, 5, 13 coupled to each other by means of the energy storage device 21 can form advantageously a vibration capable system according to the two-mass flywheel principle and can dampen rotary vibrations or can facilitate a vibration isolation of the internal combustion engine 7. In addition, it is possible by means of the centrifugal force pendulum device 51 to carry out additional vibration isolation. The centrifugal force pendulum device 51 acts like an eliminator whose stiffness is advantageously influenced by the centrifugal force or is produced by the centrifugal force. Advantageous is a natural frequency of the centrifugal force pendulum device 51 proportional to a rotational frequency. This makes it advantageously possible to very efficiently counteract selected vibration levels by way of an appropriate adjustment of elimination characteristics of the centrifugal force pendulum device 51. By using the additional centrifugal force pendulum device 51, it is possible to omit or at least essentially omit, a slippage of the start-up clutch 55 for reaching a necessary isolation.

In applications for hybrid drives as illustrated in FIG. 1, the centrifugal force pendulum device 51 may be placed advantageously before the counter pressure plate 53 of the start-up clutch 55, forming a rigid flywheel. For this purpose, the centrifugal force pendulum device 51 may be fastened to the counter pressure plate 53, the intermediate shaft 33 and/or to the rotor of the electric machine 49. Advantageously, a ground isolation can additionally be implemented via the third centrifugal mass 13 assigned to the energy storage device 21, wherein the third centrifugal mass 13 forms a clutch disk of the separating clutch 11.

Advantageously, is the additional mass of the centrifugal force pendulum device 51 is, when the separating clutch 11 is open, not assigned to the internal combustion engine 7, wherein a remaining centrifugal mass of the internal combustion engine 7 becomes as small as possible, which facilitates a restart of the internal combustion engine 7 as quickly as possible. The mass inertia moment to be accelerated by the internal combustion engine 7 can advantageously be minimized. Advantageously, primary mass inertia moments are minimized. This low primary mass facilitates advantageously a low restarting time of the internal combustion engine. Advantageously, the first centrifugal mass 3 may form a rigid flywheel of the internal combustion engine 7, the mass inertia of which is optimized.

It is possible to achieve a hybrid drive for a vehicle, particularly motor vehicle, with an automated and/or partially automated gear shift unit, so called "Clutch-by-wire," by mounting the additional separating clutch 11. Advantageously, the required isolation requirements can be met by way of the energy storage device 21 and the centrifugal force pendulum device 51 together.

Via a centrifugal wheel rigidly mounted on the crankshaft 39 or respectively the first centrifugal mass 3 and the separating clutch 11 attached to the centrifugal mass 3, the clutch disk of the separating clutch 11, i.e., the third centrifugal mass 13 is driven. This separating clutch 11 facilitates the separation of the internal combustion engine 7 from the gear unit 45. Via the toothing of the hub 31, the torque of the internal combustion engine 7 is transmitted via the intermediate shaft 33 onto the start-up clutch 55. Additionally, as necessary, the existing electric machine 49 conducts another torque into the start-up clutch 55. When the separating clutch 11 is open, wherein the internal combustion engine 7 may be standing still, the electric machine 49 can also independently drive the vehicle. By closing the separating clutch 11, the idle internal combustion engine 7 can be restarted from the various driving situations by the electric machine 49. The intermediate shaft 33 is supported in the crankshaft 39 by means of the first pilot bearing 37 and via an additional support or the bearing sheet 59 by means or the intermediate storage 57 on the housing part 61 of the housing 63. The intermediate shaft 33 is arranged on a primary side of the start-up clutch 55 and is part of the second centrifugal mass 5. The start-up clutch 55 may be subject to partial or fully automatic control and can be constructed conventional or as a self-readjusting clutch (SAC).

A disengaging device of the separating clutch 11 can be constructed so as to be fixed on the housing. A support of the gear unit input shaft 43 can take place advantageously via the second pilot bearing 41 in the intermediate shaft 33.

The centrifugal force pendulum device 51 can be placed on the rotor 47 of the electric machine 49, on the intermediate shaft 33 and/or in front of the rigid centrifugal wheel or counter pressure plate 53 of the start-up clutch 55. Alternatively, it is conceivable to use as damper in the start-up clutch 55 also a two-mass flywheel or a dampened coupling disk. For the start-up clutch 55 and the separating clutch 11 conventional clutches or even self-readjusting clutches (SAC) can be used. For actuating the separating clutch 11 it is also possible to use the disengaging device which is fixedly attached to the cover. Advantageously, the centrifugal force pendulum device 51 can also be used if a subsequently arranged stepped automated gear unit is used with or without converter or a subsequently arranged double clutch gear unit.

LIST OF REFERENCE NUMERALS

1. Torque transmission device
3. First centrifugal mass
5. Second centrifugal mass
7. Combustion engine
9. Flange
11. Separating clutch
13. Third centrifugal mass
15. Clutch linings
17. Pressure plate
19. Hydraulic operating device
21. Energy storage device
23. Sheet metal parts
25. Grease reservoir
27. Arc springs
29. Start-up flange
31. Hub
33. Intermediate shaft
35. Intermediate flange
37. First pilot bearing
39. Crankshaft
41. Second pilot bearing
43. Gear unit input shaft
45. Gear unit
47. Rotor
49. Electric machine
51. Centrifugal force pendulum device
53. Counter pressure plate
55. Start-up clutch
57. Intermediate shaft bearing
59. Bearing sheet
61. Housing part
63. Housing
65. Screw connection
67. Step
69. Exciter device
71 Axis of rotation
73. Greaseless space
75. Pendulum mass
77. Pendulum mass
79. Carrier flange
81. Cover
83. Disengaging device
85. Counter pressure plate
87. Clutch linings
89. Clutch disk
91. Clutch hub

The invention claimed is:

1. A torque transmission unit, comprising:
a first centrifugal mass non-rotatably assignable to an internal combustion engine; and
a second centrifugal mass connected downstream of the first centrifugal mass and assignable to a gear unit, the second centrifugal mass including an electric machine with a rotor for transmitting an electrically producible torque onto the second centrifugal mass, and a centrifugal force pendulum device for reducing rotary vibrations, the centrifugal force pendulum device having a carrier flange and at least one pendulum mass, the carrier flange being fixed with respect to rotation relative to the rotor.

2. The torque transmission unit according to claim 1, further comprising an energy storage device, wherein the first centrifugal mass and the second centrifugal mass are rotatable relative to each other by the energy storage device.

3. The torque transmission unit according to claim 2, further comprising a separating clutch connected between the first centrifugal mass and the second centrifugal mass.

4. The torque transmission device according to claim 3, further comprising a third centrifugal mass assigned to the second centrifugal mass via the energy storage device, the third centrifugal mass being rotatable relative to the second centrifugal mass for storage or release of energy.

5. The torque transmission device according to claim 4, wherein the third centrifugal mass is assignable to or separated from the first centrifugal mass by the separating clutch.

6. The torque transmission device according to claim 1, wherein the second centrifugal mass has an intermediate shaft and the centrifugal force pendulum device is arranged radially outside of the intermediate shaft.

7. The torque transmission device according to claim 1, further comprising one of a start-up clutch, a standard transmission, a stepped automatic gear unit, a stepped automatic gear unit with converter, a double clutch gear unit, and a CVT gear unit, wherein the one of the start-up clutch, the standard transmission, the stepped automatic gear unit, the stepped automatic gear unit with converter, the double clutch gear unit, and the CVT gear unit is connected downstream of the second centrifugal mass.

8. The torque transmission device according to claim 1, further comprising a rigid flywheel, wherein the centrifugal force pendulum device is arranged axially adjacent to the rigid flywheel.

9. The torque transmission device according to claim 8, wherein the rigid flywheel is a counter pressure plate of a start-up clutch.

10. The torque transmission device according to claim 9, wherein the centrifugal force pendulum device is arranged axially between the start-up clutch and the electric machine.

* * * * *